United States Patent [19]

Feikema

[11] Patent Number: 4,966,381
[45] Date of Patent: Oct. 30, 1990

[54] ADULT TRICYCLE

[76] Inventor: Roger H. Feikema, 1602 54th St. West, Bradenton, Fla. 34209

[21] Appl. No.: 369,843

[22] Filed: Jun. 22, 1989

[51] Int. Cl.$^5$ ............................................. B62K 5/06
[52] U.S. Cl. .............................. 280/261; 280/87.051; 296/29; 296/177
[58] Field of Search ............ 280/261, 259, 274, 288.2, 280/288.3, 87.051; 296/29, 177; 297/6

[56] References Cited

U.S. PATENT DOCUMENTS

| | | | |
|---|---|---|---|
| 279,356 | 6/1883 | Denton | 280/255 |
| 1,674,272 | 6/1928 | Zander | 280/87.041 |
| 1,738,858 | 12/1929 | White | 280/87.051 |
| 2,654,416 | 10/1953 | Maniscalco | 297/6 |
| 3,592,487 | 7/1971 | Mansperger | 280/261 |
| 4,768,536 | 9/1988 | Hawkins | 180/907 |

FOREIGN PATENT DOCUMENTS

| | | | |
|---|---|---|---|
| 167057 | 1/1906 | Fed. Rep. of Germany | 280/87.021 |
| 169181 | 3/1906 | Fed. Rep. of Germany | 280/87.021 |
| 281913 | 1/1931 | Italy | 280/261 |

Primary Examiner—Mitchell J. Hill
Attorney, Agent, or Firm—Charles J. Prescott

[57] ABSTRACT

A tricycle including a generally horizontal perimeter frame supported above the ground by a pair of rear wheels and a steerable front wheel. The perimeter frame is continuous along one side and front and back while having an opening in the opposite side just ahead of the rear wheel serving as a pass-thru for ease of entry and egress with regard to a seat positioned generally between the rear wheels. An openable gate may be provided which fits into the opening and renders this side of the frame continuous. The device is propelled by foot rotation of a forwardly positioned foot crank which is held for rotation along a generally horizontal axis between the sides of the frame. A chain gear is connected at one end of the foot crank which driveably engages an endless chain positioned in elongated fashion along one side of the frame. The chain then driveably engages a second chain gear connected to one rear wheel. The coasting feature is accomplished in the preferred embodiment by a one-way free wheel hub disposed between the foot crank chain gear and the foot crank end whereby the chain is always in motion whenever the rear wheels are rotating, although the freewheel hub may also be connected to one rear wheel instead.

2 Claims, 2 Drawing Sheets

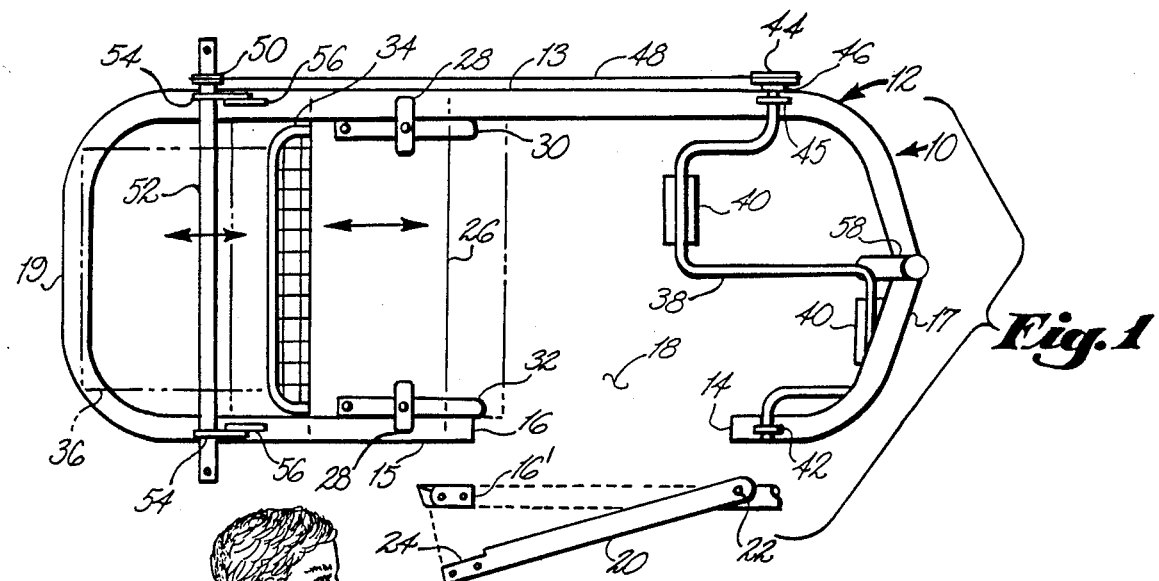
Fig. 1
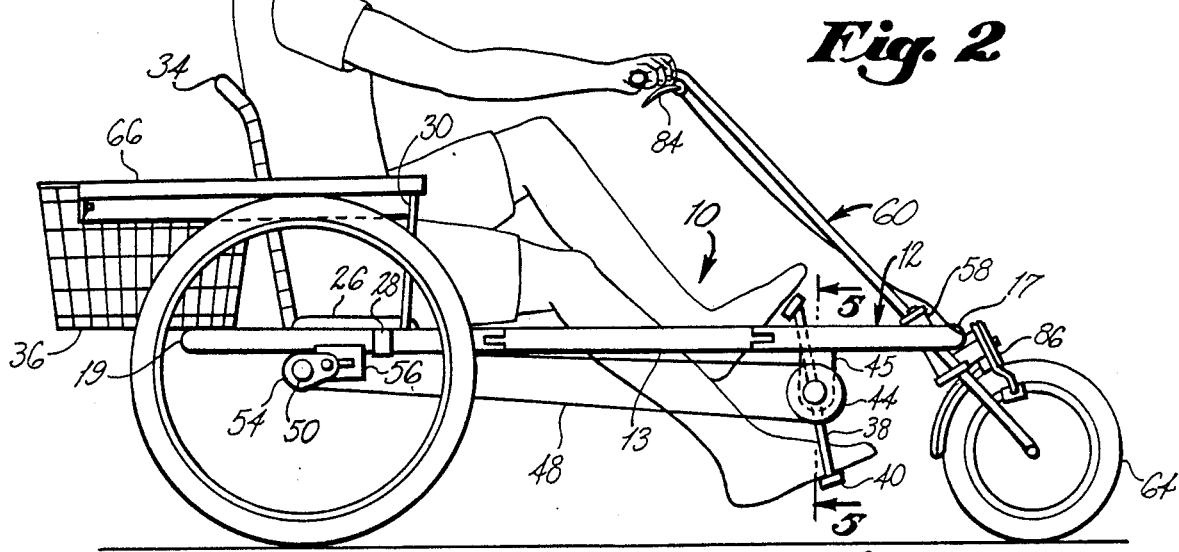
Fig. 2
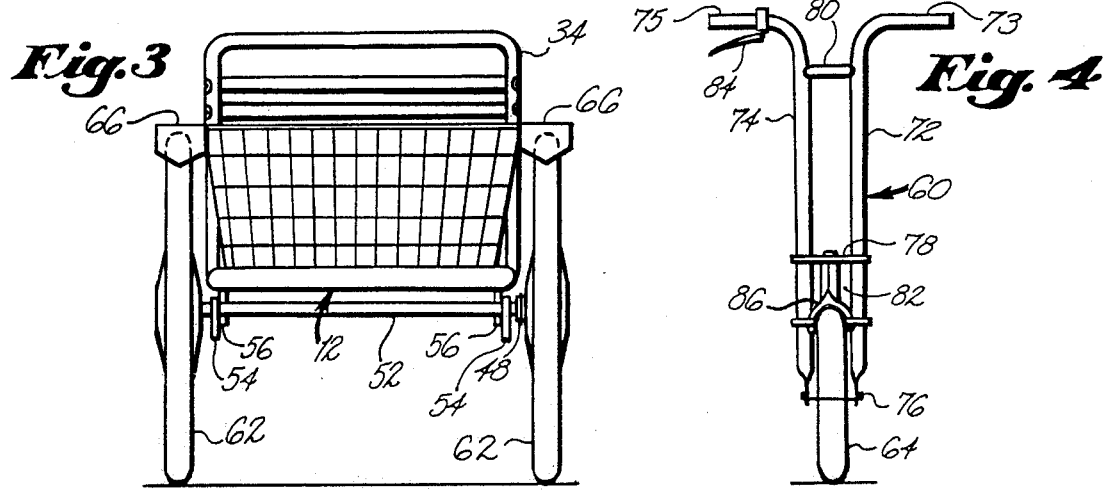
Fig. 3
Fig. 4

ADULT TRICYCLE

BACKGROUND OF THE INVENTION

This invention relates generally to velocipedes, and more particularly to a unique tricycle for seated users which incorporates an easily accessible perimeter frame and unique chain drive arrangement.

Bicycles and tricycles are almost ancient in prior art. However, most tricycles are based upon a frame structure which is similar to that of a conventional bicycle. These conventional tricycles include a conventional, rigid, on-center frame which extends from the front handlebar/fork mounting area rearwardly to support a rear axle which laterally extends to support spaced apart rear wheels. A sprocket is mounted at a mid-point in the lower portion of the frame having pedals extending outwardly from either side of the sprocket and chain drive.

In use, these conventional tricycles require that the user step over at least the sprocket area of the frame and, thereafter, in a seated position, rotate the pedals by foot motion with the legs astride the frame area. The endless chain used to transfer rotational motion from the pedal chain gear to the rear wheels is generally oriented along the frame and between the user's legs and must be shielded in some fashion.

The present invention provides a tricycle having a perimeter frame with one side and front and back portions being continuous while the other side includes an opening forwardly of the rear wheel which allows the user easy entrance and egress from the seating area of the tricycle. A unique drive system which disposes the chain beneath or adjacent one side of the frame is also provided and wherein manufacturing economies are realized by providing a freewheel chain gear in conjunction with the forwardly positioned foot crank.

BRIEF SUMMARY OF THE INVENTION

This invention is directed to an adult tricycle which includes a generally horizontal perimeter frame supported above the ground by a pair of rear wheels and a steerable front wheel. The perimeter frame is continuous along one side and front and back while having an opening in the opposite side just ahead of the rear wheel on that side serving as a pass-thru for ease of entry to and egress from, a seat positioned generally between the rear wheels. An openable gate may be provided which fits into the opening and renders this side of the frame continuous. The device is propelled by foot rotation of a forwardly positioned foot crank which is held for rotation along a generally horizontal axis between the sides of the frame. A chain gear is connected at one end of the foot crank which driveably engages an endless chain positioned in elongated fashion along one side of the frame. The chain then driveably engages a second chain gear connected to one rear wheel. The coasting feature is accomplished by a one-way free wheel hub disposed between the foot crank chain gear and the foot crank end whereby the chain is always in motion whenever the rear wheels are rotating.

It is therefore an object of this invention to provide a unique tricycle for use in a conventional seated orientation having a perimeter frame which includes an opening in one side to allow easy entrance and egress from its central seat area.

It is another object of this invention to provide a unique drive system for an adult tricycle which positions the endless chain to one side beneath or adjacent one side portion of the perimeter frame.

It is yet another object of this invention to provide a more economical drive system for the adult tricycle by placement of a free-wheeling chain gear in conjunction with the forwardly positioned foot crank.

It is yet another object to provide the above invention having a distinctive an easy-to-manufacture front fork area for supporting the front wheel and for steering the tricycle.

In accordance with these and other objects which will become apparent hereinafter, the instant invention will now be described with reference to the accompanying drawings in which:

BRIEF DESCRIPTION OF THE DRAWINGS

FIG. 1 is a bottom plan view of the invention absent its front and rear wheels and also depicting an optional openable gate.

FIG. 2 is a side elevation view of the invention.

FIG. 3 is a rear elevation view of the invention.

FIG. 4 is a front elevation view of the front fork and front wheel.

DETAILED DESCRIPTION OF THE INVENTION

Figure 5:
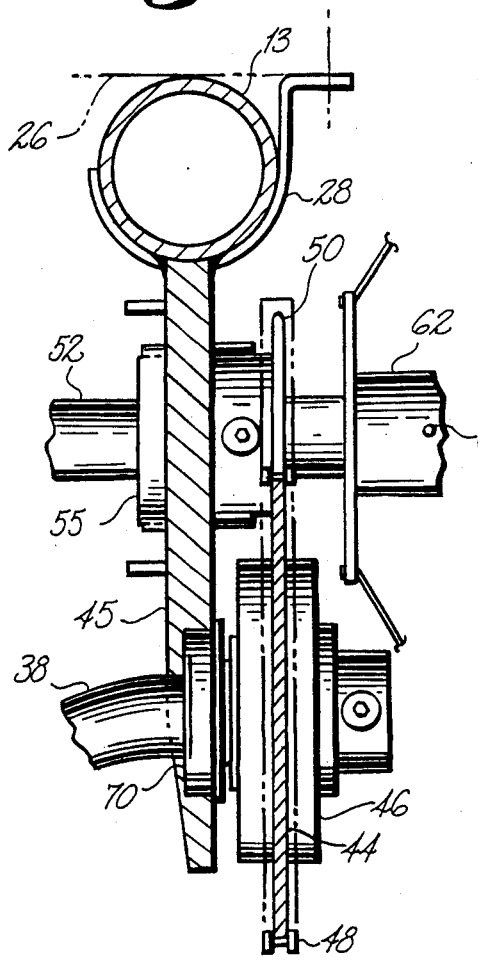
FIG. 5 is a section view in the direction of arrows 5—5 in FIG. 2.

Referring now to the drawings, and particularly to FIGS. 1, 2 and 3, the invention is shown generally at numeral 10 an includes a perimeter frame 12 which is supported generally in a horizontal orientation above the ground by rear wheels 62 and front wheel 64. The perimeter frame 12 is fabricated preferably of a length of rigid tubing having a first end 14 which extends into a front portion 17, then to a side portion 13, then to a back portion 19 and finally to a second side portion 15 ending at 16. This frame configuration thus provides an opening 18 between first end 14 and second end 16 of the length of rigid tube.

A seat 26 and connected seat back 34 are provided mounted by brackets 28 atop the perimeter frame 12. Seat 26 is adjustable fore and aft in the direction of the arrows. Spaced arm rests 30 are connected to seat 26 and a carrying basket 36 is also connected to the rear portion 19 of the perimeter frame and to the seat back 34 for added stability.

Rear wheels 62 are rotatably mounted on axle 52 which, in turn, is adjustably mounted fore and aft in the direction of the arrows by connecting plates 54 bolted to brackets 56 which are rigidly connected to the perimeter frame 12.

Referring additionally to FIG. 4, front wheel 64 is rotatably mounted at the lower end of a front fork shown generally at numeral 60. This front fork 60 is fabricated of two lengths of rigid tubular members 72 and 74 which are held in spaced apart relationship by brackets 78 and 80 and are rotatably connected to front wheel 64 along axle 76. The upper ends 73 and 75 of fork portions 72 and 74 respectively, are bent laterally outwardly as shown to form the steering handle. A conventional hand brake 84 interconnected to friction brake means 86, acting against the rim of the front wheel 64 by conventional cable is also provided.

Fork 60 is rotatably mounted within fork tube 58 which is connected to the center of front frame portion 17. Fork tube 58 is angularly disposed as best seen in FIG. 2 to provide the desired steerability and wheel base.

As seen in FIG. 1, opening 18, which readily facilitates entrance to, and egress from, the seat 26 by a user, may be closed by gate 20 which is hingedly connected at 22 to the front frame portion 17 adjacent first end 14 and is releasably innerengageable at 24 to the second end 16 of the perimeter frame by conventional latching means. Thus, when gate 20 is in its closed position, the side 15 of perimeter frame 12 is complete and continuous.

Fenders 66 are also provided connected to arm rests 30 and 32 and to seat back 34 to cover the upper portion of the rear wheels 62 so as to avoid contact between the rear wheels 62 and the clothing, arms, and upper torso of the user.

Referring additionally to FIG. 5, the manual drive system of the invention 10 is in the form of a foot crank 38 formed of a length of steel rod and having pedals 40 rotatably disposed on the throws of the foot crank 38 which is itself mounted along a horizontal transverse axis at its ends within bearings 70. These bearings 70 are mounted in vertical plates 42 and 45 which are rigidly connected along the lower edge of the perimeter frame 12 as shown. Connected adjacent one end of crank 38 is free wheeling hub 46. The preferred embodiment of the free wheeling hub 46 is manufactured by Shimano Model No. SF1100. This hub 46 includes chain gear 44 connected thereto whereby the chain gear 44 will rotate freely with respect to hub 46 in one direction and will rotatably lockably engage with respect to the hub 46 and foot crank 38 in the opposite direction.

An endless chain 48 is operably engaged around chain gear 44 and then rearwardly extends in generally horizontal fashion adjacent frame side portion 13 to operably engage around rear wheel chain gear 50. This rear wheel chain gear 50 is rigidly connected to the corresponding rear wheel 62.

By this arrangement, then, when foot crank 38 is driveably rotated by foot motion in one direction, it results in the corresponding rear wheel 62 being driven to propel the vehicle 10. When the pedaling of foot crank 38 ceases, free wheel hub 46 continues to allow chain gear 44 to rotate, driven by the forward motion of the vehicle 10, driving the corresponding rear wheel 62 which, in turn causes the endless chain 48 to continue to move in its customary fashion.

Because the endless chain 48 is disposed off to the side in a close proximity to side frame portion 13, a distinctive advantage and feature of the invention is realized. No clothing or body inneraction is encountered during the use of the vehicle because of the offset positioning of the endless chain 48. Further, an economy of manufacture is realized by the elimination of a more sophisticated sprocket in conjunction with the driving rear wheel 62. Only the free wheeling hub 46 is required to achieve propulsion and coasting features; however, as a result, endless chain 48 is always in motion so long as the vehicle 10 is moving forward, driven by the corresponding rear wheel 62 as previously described.

Figure 7:
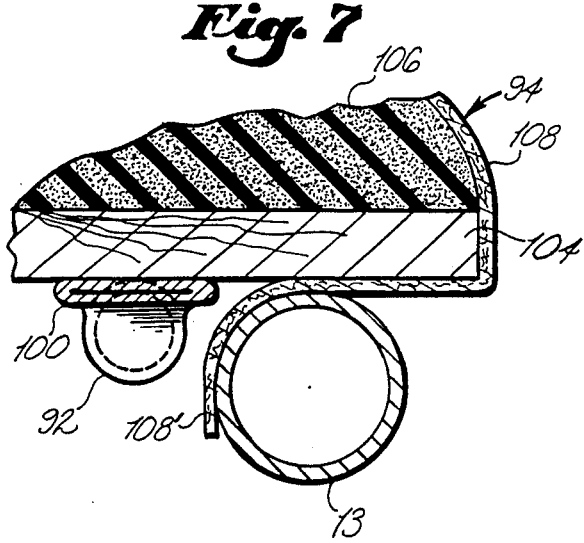
FIG. 7 is a section view in the direction of arrows 7—7 in FIG. 6.
Figure 6:
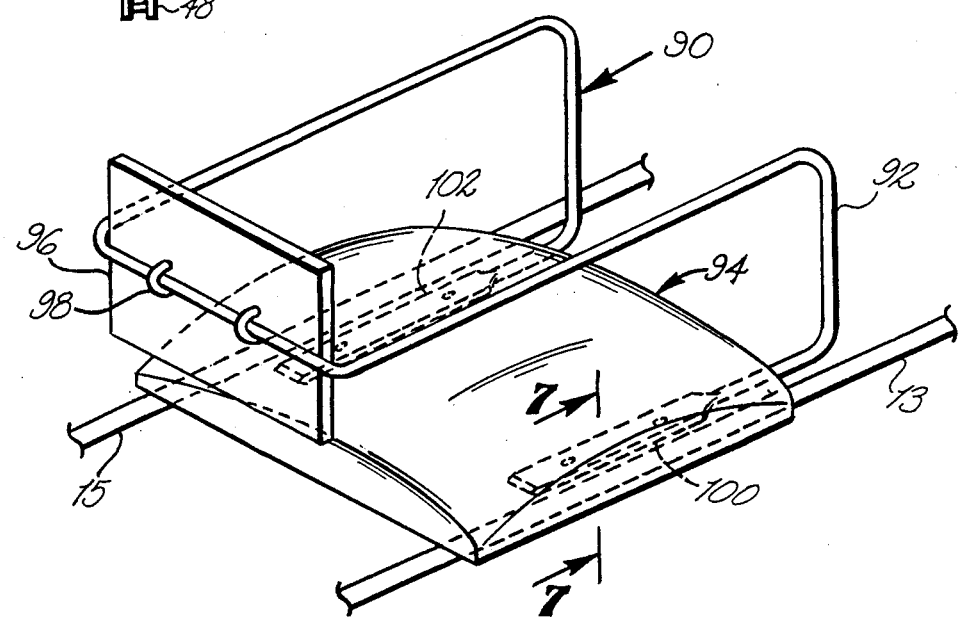
FIG. 6 is a perspective view of the preferred embodiment of the unitized seat of the invention.

Referring now to FIGS. 6 and 7, the preferred embodiment of the integral seat is shown generally at numeral 90. This seat 90 includes a padded seat cushion 94 and a unitary formed tubular handle arrangement 92 having a rotatable seat back 96 connected thereto by U-brackets 98. The padded seat 94, as best seen in FIG. 7, includes a wood base plate 104 having a layer of closed-cell flexible foam 106 disposed thereatop and covered by a layer of naugahyde, vinyl or the like shown at 108. The padded seat 94 rests atop, and is connected to, frame side portions 13 and 15 by brackets 28 as shown in FIGS. 1, 2 and 5. The flexible vinyl cover 108 extends inwardly between the bottom of base plate 104 and side frame portions 13 and 15 at 108' so as to provide additional retaining pressure of the naugahyde cover 108 against the bottom surface of base plate 104.

Unitary handle 92 is formed of a single length of rigid tubing and is flattened at its end portions 100 and 102 so as to provide a better structural arrangement for interconnection by conventional fastening means to the base plate 104.

Integral seat 90 is adjustably connected atop side frame portions 13 and 15 by brackets 28 as previously described (not shown in FIGS. 6 and 7) so that the entire seat 90 is adjustable fore and aft with respect to the perimeter frame 12 and foot crank 38. The basket 36 previously described may also be attached and made integrally moveable with slot 90 by clamp interconnection (not shown) adjacent clamps 98 and positioned rearwardly of seat back 96.

While the instant invention has been shown and described herein in what is conceived to be the most practical and preferred embodiment, it is recognized that departures may be made therefrom within the scope of the invention, which is therefore not to be limited to the details disclosed herein, but is to be accorded the full scope of the claims so as to embrace any and all equivalent apparatus and articles.

What is claimed is:

1. A tricycle comprising:
   a steering handle operably connected to a front wheel;
   a tubular frame having spaced first and second sides and spaced front and rear portions and generally horizontally disposed and supported above the ground by spaced rear wheels and said front wheel, said rear wheels operably connected for rotation to, and positioned nearer to said rear portion, said front wheel operably connected to said front portion for both rotation and steering of said tricycle by said steering handle;
   a seat connected to a mid-portion of said frame;
   a front pedal drive axle operably connected between said first and second sides;
   a foot crank connected for driving rotation of said drive axle;
   a chain drive operably connected between said drive axle and one of said rear wheel for propelling said tricycle over ground in response to foot rotation of said foot crank;
   said chain drive positioned in close proximity to one of said frame sides;
   said frame forwardly extending along said first side from said drive axle to said front portion and around to said second side, then rearwardly to and around said rear portion and forwardly along said first side said first side terminating forward of one said rear wheel and rearward of said drive axle providing a frame opening in said first side for ingress and egress.

2. A tricycle as set forth in claim 1, further comprising:
   an openable gate pivotally connected at one end to said frame at one end of said opening, said gate closable within and extending across said opening.

* * * * *